ical Patent [19]

Lobregt et al.

[11] Patent Number: 4,761,738
[45] Date of Patent: Aug. 2, 1988

[54] COMPUTER TOMOGRAPHY APPARATUS INCLUDING A COMBINED RECURSIVE AND CONVOLUTION FILTER

[75] Inventors: Steven Lobregt; Johannes C. A. Op de Beek; Roelof Werkman, all of Eindhoven, Netherlands

[73] Assignee: U.S. Philips Corporation, New York, N.Y.

[21] Appl. No.: 884,453

[22] Filed: Jul. 11, 1986

[30] Foreign Application Priority Data

Apr. 21, 1986 [NL] Netherlands ............ 8601004

[51] Int. Cl.$^4$ ............................................. G06F 15/62
[52] U.S. Cl. .................................. 364/414; 378/901; 364/572
[58] Field of Search ....................... 364/414, 572, 724; 378/901

[56] References Cited

U.S. PATENT DOCUMENTS 3,924,129 12/1975 LeMay ................................ 364/414
4,549,265 10/1985 Decker ................................ 364/414

Primary Examiner—Jerry Smith
Assistant Examiner—Gail O. Hayes
Attorney, Agent, or Firm—Jack E. Haken

[57] ABSTRACT

In a computer tomography apparatus in accordance with the invention the advantages of the convolution calculation are combined with the advantages of recursive filtering. The processing unit for the measurement data includes a convolution filter which has only 64 convolution factors and which performs the central part of a convolution calculation (the number of measurement data amounts to, for example 512 or 1024) and a parallel-operating recursive filter which approximates the rests of the convolution calculation situated outside the central part by recursive filtering of the measurement data. Using five different multiplication factors and a corresponding number of attenuation factors, ample accuracy is achieved. By variable of only the 64 convolution factors, a large number of different filters can be realized, without it being necessary to change the factors for recursive filtering.

10 Claims, 4 Drawing Sheets

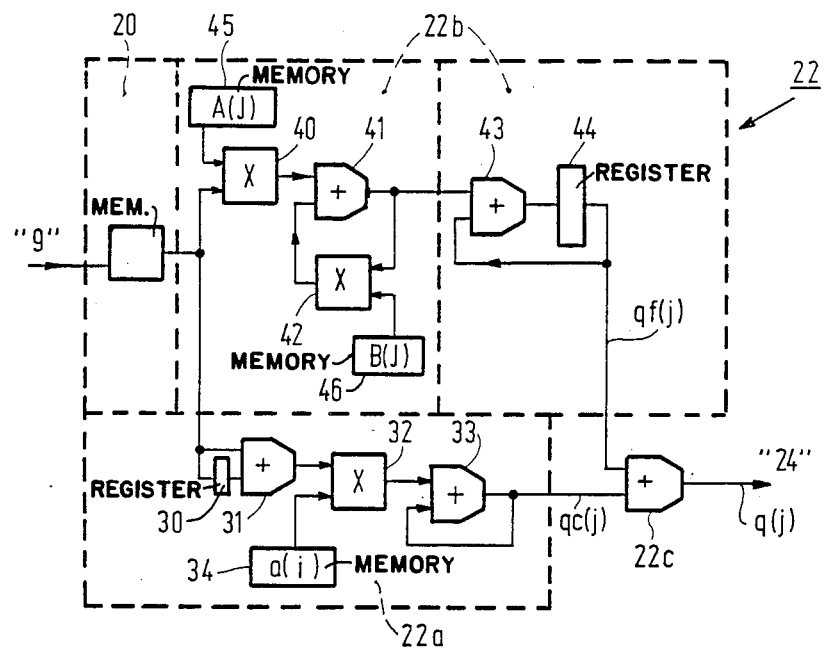
FIG.9
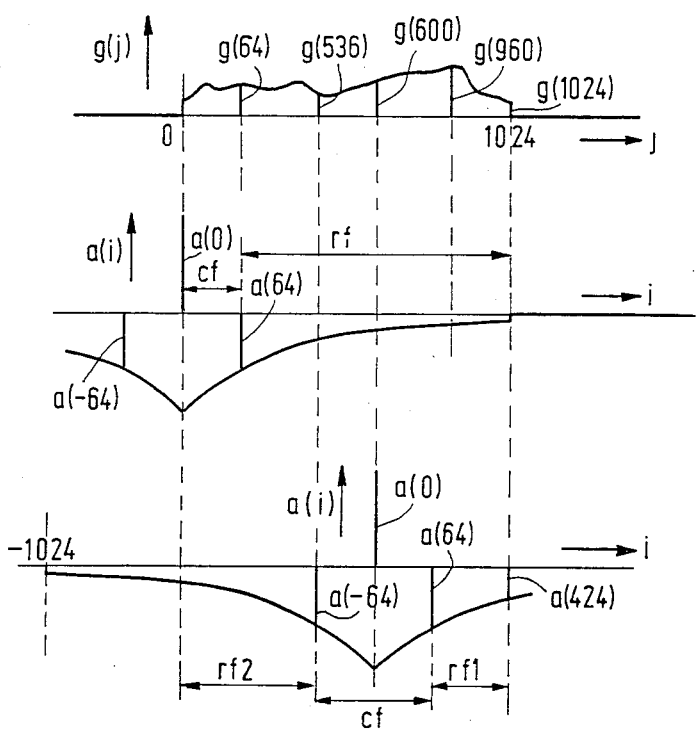
FIG.10a
FIG.10b
FIG.10c

COMPUTER TOMOGRAPHY APPARATUS INCLUDING A COMBINED RECURSIVE AND CONVOLUTION FILTER

The invention relates to a computer tomography apparatus for determining a radiation attenuation distribution in a region of a body, including a radiation source and radiation source displacement means for irradiating a region of the body from a plurality of source positions, which apparatus also includes detection means for detecting attenuated radiation having passed through the body in order to form groups of measurement data, a filter device for determining back-projection data from the measurement data, a back-projection unit for determining the attenuation distribution from the groups of back-projection data, and storage means for the storage of at least the attenuation distribution determined.

An apparatus of this kind is known from U.S. Pat. No. 4,549,265. The apparatus disclosed therein includes a filter device for filtering the groups of measurement data. The filter device may be either a convolution unit or a Fourier transformer, frequency filter and Fourier back-transformer. Such filter devices are either expensive, compact and fast or require a long calculation period, particularly when convolution calculations are performed and a group of measurement data comprises a number of 512 or 1024 values. Applied fast Fourier transformations have actually been developed for periodic signals, so that they are problematic. Calculation methods are known, notably from U.S. Pat. No. 3,924,129, where a filter device converts the measurement data into back-projection data more quickly. The filter devices described are recursive filters. The measurement data are very quickly processed by these filters; however, it is a drawback that only a limited number of types of filter having a special characteristic can be realized. In the apparatus of the kind set forth, however, the use of different characteristics for the processing of the measurement data is often desirable. The majority of the filters desired for use cannot be realized by means of the recursive filters disclosed in U.S. Pat. No. 3,924,129; this is a drawback.

It is the object of the invention to provide a computer tomography apparatus for determining a radiation attenuation distribution in a region of a body in which the measurement data can be very quickly pressed at economically acceptable costs by recursive filters and in which the various characteristics desired for processing can be realized.

To achieve this, the apparatus in accordance with the invention is characterized in that the filter device includes at least one convolution unit and at least one recursive filter unit whose outputs are connected to an adder unit whose output is connected to the back-projection unit.

Such a construction of an apparatus in accordance with the invention combines the advantages of direct or spatial convolution filtering as well as of recursive filtering. The speed of processing of the measurement data is thus increased whilst the costs of realizing the filter device are substantially reduced.

Embodiments in accordance with the invention will be described in detail hereinafter with reference to the drawing; therein:

FIG. 1 diagrammatically shows an apparatus in accordance with the invention,

Figure 8A:
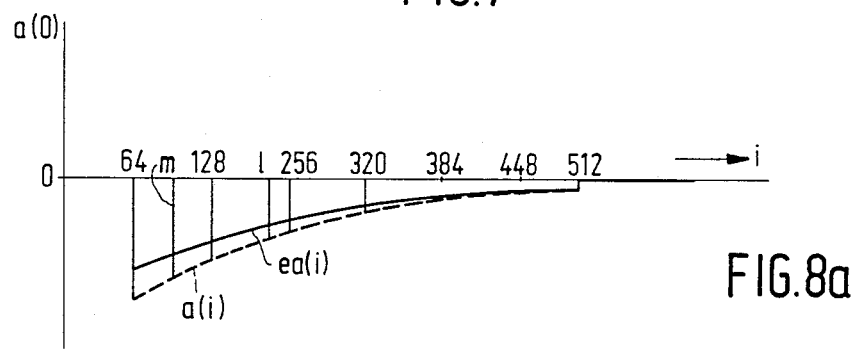

FIGS. 8a, b and c graphically illustrate a procedure for determining exponents for the recursive filter unit, FIG. 9 shows a detailed diagram of a filter device in accordance with the invention, and FIGS. 10a, b and c illustrate the operation of the filter device in accordance with the invention.

Figure 1:
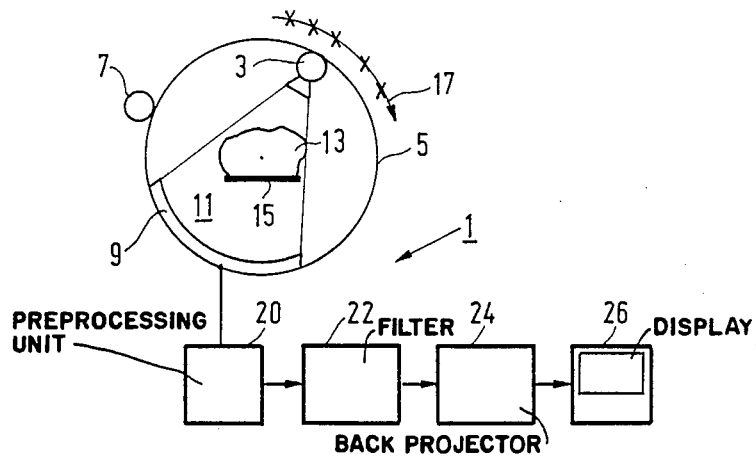

FIG. 1 diagrammatically shows an embodiment of an apparatus 1 in accordance with the invention. The apparatus 1 includes a radiation source 3 in the form of, for example an X-ray tube having a rotary anode or an elongate stationary anode which is scanned by means of an electron beam. The radiation source is mounted on a frame 5. The frame 5 is rotatable by means of drive means 7 (for example, by means of an electric motor). On the frame 5 there is also arranged a detector device which includes a row of detectors 9 for detecting an X-ray beam 11, generated by the source 3, after the passage of the beam through an object 13 arranged on a table 15. The radiation source 3 is moved to different positions with respect to the object 13 by the drive means 7 (in cooperation with the scanning electron beam or not); the source positions are denoted by crosses on an arrow 17. The radiation measured by the row of detectors 9 results in groups of diverging or virtually diverging measurement data which is applied to a preprocessing unit 20 which may include a buffer memory. The measurement data processed in the preprocessing unit 20 are applied to a filter device 22 for filtering, after which the back-projection data thus obtained is applied to a back-projection device 24 for reconstructing the image. The reconstructed image can be displayed on a monitor or display unit 26. As appears from FIG. 2, the filter device 22 in accordance with the invention includes a convolution unit as well as a recursive filter unit. The assembly shown in FIG. 2 operates as follows. A group of measurement data stored in the buffer memory of the preprocessing unit 20 is applied to the convolution unit 22a as well as to the recursive filter unit 22b. Measurement data is applied to the convolution unit 22a in order to be convoluted by either 63 or 127 convolution factors. The measurement data is also processed by the recursive filter unit 22b. The operation of the recursive filter unit 22b will be described in detail hereinafter. After the processing of the measurement data by the units 22a and 22b, the results appearing on the outputs of the units 22a and 22b are applied to an adder unit 22c which, after addition of the results, applies the back-projection data thus obtained to the back-projection unit 24 shown in FIG. 1. This method of processing the measurement data will be described with reference to FIG. 3 and the subsequent Figures.

The apparatus described in U.S. Pat. No. 3,924,129 includes some (up to five) parallel-operating recursive filters for determining filtered values from the measurement data, said filtered values being used to form an image via a back-projection unit. The parallel-operating recursive filters actually perform a convolution calculation between a series of convolution numbers (L factors) and each group of measurement data. Because of the behaviour of the recursive filters, the series of convolution numbers represents a geometrical progression of numbers. The convolution progressions used in computer tomography are generally not geometrical, so that it is necessary to correct the value generated by the recursive filters. Although U.S. Pat. No. 3,924,129 mentions such corrections, it fails to indicate how these corrections relate to the factors to be used in the recursive filters.

Figure 2:
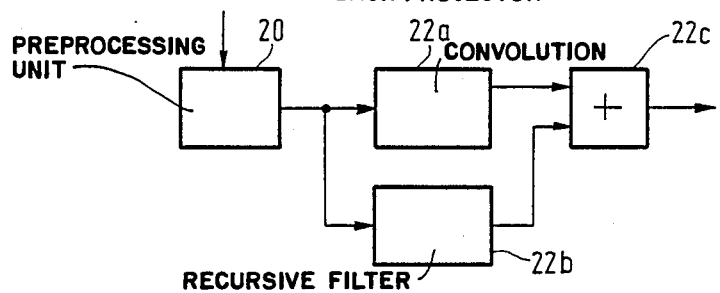
FIG. 2 shows a block diagram of the filter device shown in FIG. 1.
Figure 3:
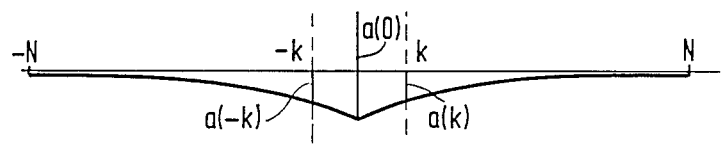
FIG. 3 is a graphic representation of a series of convolution factors.

FIG. 3 diagrammatically shows a convolution progression which contains N+1 different convolution factors a(i) (where i=0, +1, −1, +2, −2, ..., +N, −N) and which thus has a length of 2N+1 terms. A convolution progression comprising 2N+1 terms is necessary for the processing of N+1 measurement data of a group. In accordance with the invention, the convolution progression is subdivided into two sections. A first (central) section contains the central factor a(0) and on both sides thereof a short row of factors a(i), where $0 < |i| < k$. The central section is processed with the measurement data in a direct convolution calculation by the convolution unit 22a (FIG. 2). The second section of the convolution progression comprises two "tails" of the progression with the terms a(i) and a(−i), where $k \leq |i| \leq N$, which are approximated by a recursive filtering operation (22b, FIG. 2) during the processing of a group of measurement data. In practice, k amounts to, for example 32 or preferably to 64, and N+1 may have the value 257, 513 or 1025. The direct convolution and the recursive filtering operation are independently performed. The convolution factors a(i), where k i N, are approximated by a sum of n exponents:

$$ea(i) = \sum_{j=1}^{n} A(j) \cdot \exp(i \cdot B(j)).$$

The approximation should be chosen so that the difference between the actual convolution factor a(i) and the approximation ea(i) is always smaller than or equal to a given maximum deviation ϵ, so that $$-\epsilon \leq a(i) - ea(i) \leq \epsilon.$$

It has been found that a convolution progression as described in IEEE Transactions Nuclear Science, Vol. NS 21, No. 1, February 1974, pages 228–235, by L. A. Shepp and B. F. Logan, can thus be sufficiently accurately approximated (the filter for this convolution progression is referred to as the Shepp filter hereinafter).

Figure 4:
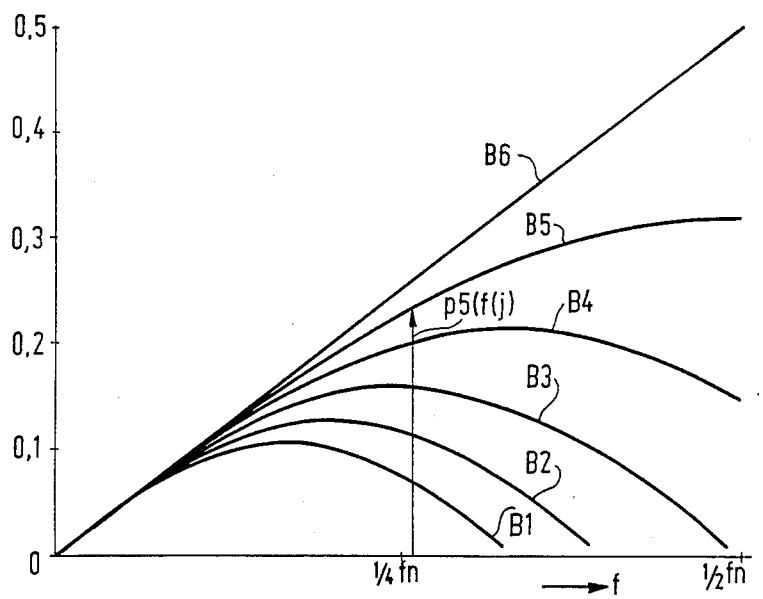
FIGS. 4, 5, 6 and 7 show frequency characteristics of filter devices.

FIG. 4 shows the frequency characteristics of various filters B1 to B6 which are used in state of the art computer tomography apparatus and in the computer tomography apparatus in accordance with the invention. The Shepp filter is denoted by the reference numeral B5. The other filters shown have convolution factors which vary so that they cannot be simply approximated by a sum of exponents as proposed for an apparatus in accordance with the invention. The convolution factors of the Shepp filter form a monotonously descending function. The convolution factors of the filter B6 (referred hereinafter as the Ramachandran filter) have, for example the value 0 for all factors having an even index (with the exception of the factor a(0); this is described inter alia in Physics in Medicine and Biology; 1975; Vol. 20, No. 4; 632–636, by D. Chesler and S. Riederer), It is advantageous to subject the measurement data of each group to a prefiltering operation before the processing by means of one of the above filters B1 to B6. This prefiltering operation is used for enhancing the edges of the object images to be displayed (enhancement filtering).

Figure 5:
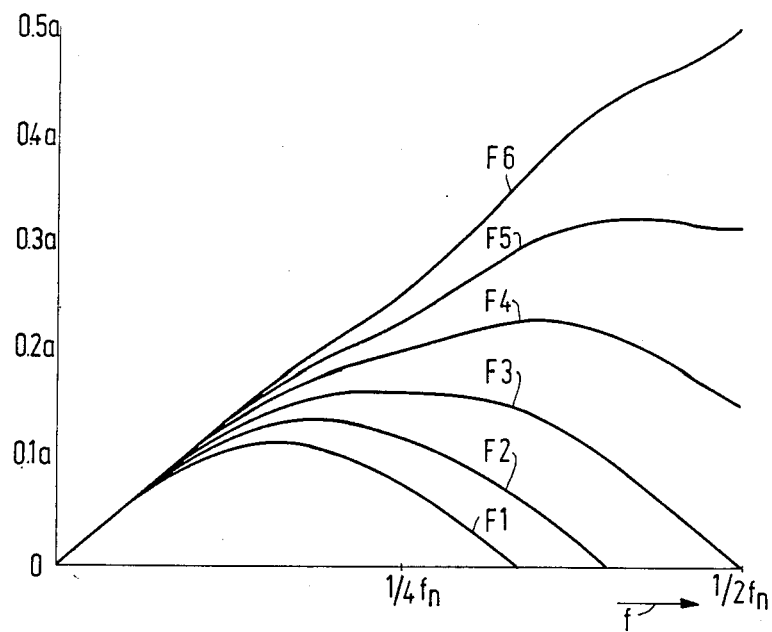

Such prefiltering can be executed by means of a nine-point filter which knows five convolution factors: w(0)=1.04; w(1)=w(−1)=0; w(2)=w(−2)=0; w(3)=w(−3)=0; w(4)=w(−4)=−0.02. As appears from the cited publication by Chesler and Riederer (Phys. Med. Biol., 1975), the prefilter can be combined with the convolution filter so as to form one filter. When such a combination is realized for the prefilter given above by way of example and the filters B1 to B6 of FIG. 4, the frequency characteristics F1 to F6 as shown in FIG. 5 are obtained. Again filters having such frequency characteristics cannot be simply realized as in the apparatus in accordance with the invention.

In the computer tomography apparatus in accordance with the invention this problem is solved as follows. Use is made of the Shepp filter (FIG. 4, B5) which is each time combined with a different prefilter FP1 to FP6 so that the frequency characteristics B1 to B6 are approximated (for the Shepp filter the prefilter should have the convolution factors w(0)=1 and w(1)=w(−1) to w(4)=w(−4)=0).

For a (nine-point) prefilter the convolution factors can be determined from the following calculation, for which it is given that the prefilter which is combined with the Shepp filter (convolution of two progressions of convolution factors) has a frequency spectrum which is determined by the quotient Q (per frequency) of the amplitude of the frequency characteristic (to be approximated) and the amplitude of the frequency characteristic of the Shepp filter. For a nine-point prefilter the following equation can be drafted for five different frequencies f(j):

$$w(0) + 2 \cdot \sum_{i=1}^{4} (w(i) \cdot \cos(2\pi i \cdot s \cdot f(j))) =$$

$$Q(f(j)) = p(f(j))/p5(f(j)),$$

where w(0) and w(i) are the convolution factors of the desired prefilter to be determined, s is the distance between two neighbouring measurement paths along which measurement data are determined, p(f(j)) is the amplitude of a filter to be approximated at the frequency f(j), and p5(f(j)) is the amplitude of the Shepp filter (see FIG. 4). Thus, a matrix of five equations with five unknowns is found which offers the five convolution factors of the prefilter after solution. The following prefilters can be used for approximating the other filters B1 to B4 and B6 from the Shepp filter B5:

|  | FP1 | FP2 | FP3 | FP4 | FP6 |
|---|---|---|---|---|---|
| w(0) | .406791 | .501962 | .644869 | .832042 | 1.158416 |
| w(1) = w(−1) | .263294 | .258107 | .203779 | .100307 | −.099036 |
| w(2) = w(−2) | .050000 | −.005656 | −.033820 | −.021385 | .026420 |
| w(3) = w(−3) | −.013294 | −.008106 | .010308 | .006942 | −.009163 |
| w(4) = w(−4) | −.003395 | .004675 | −.002701 | −.001885 | .002572 |

Figure 6:
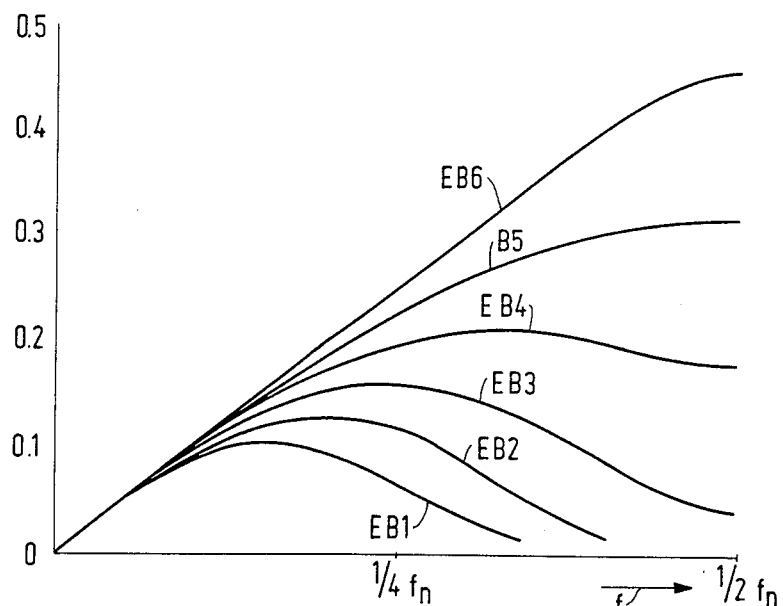

The filters EB1 to EB4 and EB6 realized by combining the above prefilters with the Shepp filter are shown in FIG. 6. On the basis of the Shepp filter B5, the other filters can thus be approximated as appears from a comparison of the FIGS. 4 and 6. When the progressions of convolution factors of the filters EB1 to EB6 are determined and compared, it appears that only some tens of convolution factors a(i) of each convolution progression which are situated about the convolution factor a(0), (see FIG. 3) deviate more or less from the corresponding factors a(i) of the other convolution progressions (i<30). For the remaining convolution factors a(i), where i≧30, the deviations are negligibly small in the filters EB1 to EB6. It follows therefrom that for all six filters (and certainly also for many other filters not considered herein) a method of calculation can be used as described with reference to FIG. 3 where the exponents for the recursive filtering are always the same. Merely the convolution factors a(−k) and a(k) (where k<32 or 64) need be adapted for changing a filter. If desired, these convolution factors may also remain constant; in that case they may be eqaual to the factors of the Shepp filter, merely another prefilter then being used for changing the filter. Although in that case, for example only five constant values need be adjusted (or six, seven, eight, ... different coefficients in the case of prefilters having more than five different coefficients such as 11, 13, 15, ... -point convolution filters), the number of arithmetic operations will be greater in comparison with the adaptation of, for example 32(a(i), where |i|<32, convolution factors and the integration of the prefilter in the convolution filter. Preferably, 64 convolution factors are always adapted when the convolution filter is changed.

Figure 7:
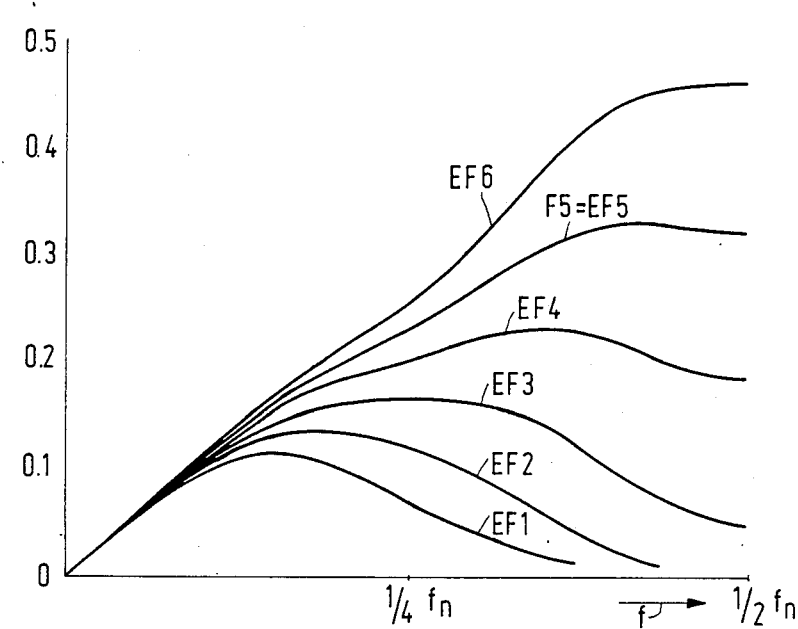

When the filters thus determined, having the frequency characteristics EB1 to EB6 (see FIG. 6), are combined with a prefilter as described with reference to the FIGS. 4 and 5 which converts the frequency characteristics B1 to B6 (FIG. 4) into the frequency characteristics F1 to F6 (FIG. 5), filters having characteristics EF1 to EF6 (see FIG. 7) will be obtained which are an aproximation of the filters having the characteristics F1 to F6 shown in FIG. 5. It has been found that for the filters having the characteristics EF1 to EF6 it is again merely necessary to adapt the convolution factors a(i), where |i|<32 or 64, and that the exponents required for recursive filtering need not be changed.

FIGS. 8a and b diagrammatically illustrate the method of approximating the convolution progression. It will be apparent from the foregoing that for the filtering of a group of measurement data in accordance with the invention it is sufficient to use each time the central factors a(i) (where 0≦|i|<32 or 64) of a series of convolution factors and to approximate the other factors a(i), (where |i|≧32 or 64) by means of a factor ea(i) which is approximated by a sum of M exponents:

$$ea(i) = \sum_{j=1}^{n} A(j) \cdot \exp \cdot (b(j) \cdot i).$$

The number A(j) is referred to as the multiplication factor and the number B(j) is referred to as the attenuation factor. For determining an approximation of a first multiplication factor A and a first attenuation factor B, the following calculation (calculations) is (are) performed. Starting from the convolution factors a(N) and a(m), m having the value (N−64)/2 or (N−64)/2+1, N being even and odd, respectively, the following holds good:

$$a(N) = A1 \cdot \exp (B1 \cdot N)$$

$$a(m) = A1 \cdot \exp (B1 \cdot m)$$

From these two equations it can be deduced that $$A1 = a(N)(\exp B1 \cdot N)^{-1}, \text{ and}$$

$$B1 = (\ln a(N) - \ln a(m)) \cdot (N-m)^{-1}.$$

A similar calculation is always performed with the convolution factors a(N−1) and a(m−1), a(N−2) and a(m−2), a(N−3), a(m−3), ..., a(N−m+1) and a(64) wherefrom invariably a value is derived for the multiplication factor A1 and the attenuation factor B1. A mean value A(1) is determined from all factors A1 calculated. Similarly, a means value B(1) is determined from all factors B1 calculated. Using the factors A(1) and B(1) formed, the values ea(i) are calculated for the section from i=64 to N. These values ea(i) are compared with the convolution factors a(i). When a difference which is larger than a maximum permissible deviation ε (for example 2·10⁻⁷) occurs between the calculated value ea(i) and the desired value a(i) for one or more convolution factors, the preceding calculation is performed again; however, the path for which these calculations are made then extends from i=65 to N. When, after the reduction of the path, there are still differences which are larger than ε between the values ea(i) and a(i), the path is shortened again (66≦i≦N). The preceding steps are repeated until a path 1 to N is found in which all approximations ea1(i) deviate from the desired value a(i) by less than ε. Using the multiplication factor A(1) and the attenuation factor B(1) thus found, all approximations ea(i), where i=64 to N, are calculated and subtracted from the desired convolution factors a(i). In FIG. 8a these approximations ea(i) are denoted by a non-interrupted line and the desired values a(i) are denoted by a broken line as a function of i(6-4≦i≦512). By way of example it is assumed that for i>1=320, the deviation between a(i) and ea(i) is smaller than ε.

Figure 8B:
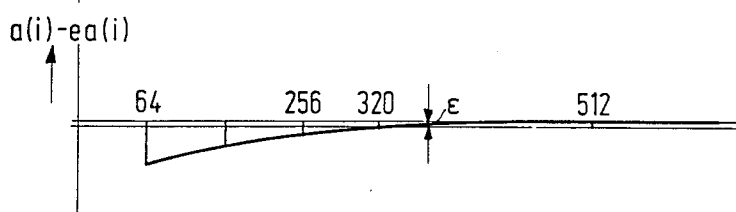

FIG. 8b shows the difference between the values a(i) and ea(i). Because this difference is smaller than ε for i≧320, the described calculations are repeated in order to determine a multiplication factor A(2) and an attenuation factor B(2), the path in which the calculations are performed being determined by 64≦i<1=320. When, after determination of the factors A(2) and B(2), in this path deviations are found between the approximations ea2(i) and the value (a(i)=ea(i)) calculated by means of the factors A(2) and B(2) which are larger than the permissible deviation ε, the path is shortened again in the described manner. For the new path (64≦i<1=320), factors A(2) and B(2) are calculated again. This procedure is continued until a (shortened) path is found in which all deviations are smaller than ε, for example the path 185<i<320.

After determination of the residual values in the path 64≦i<185, a multiplication factor A(3) and an attenuation factor B(3) are determined for this path (or a shortened path therein where 64<t<i<185).

It may be stated in general that, using four multiplication factors A(1) to A(4) and four associated attenuation factors B(1) to B(4), the convolution factors a(i), where 64≦i≦512 or 1024, are adequately approximated. In that case there are four consecutive paths: 64 upto and including N4, N4+1 upto and including N3, ..., N2 upto and including N.

Figure 8C:
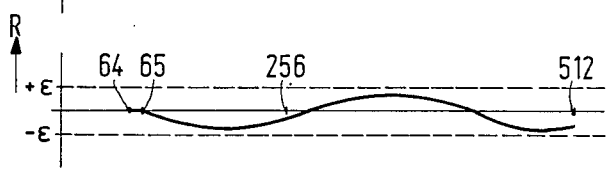

Generally, the approximation convolution factor ea(64) (or ea(32)) will not "smoothly" adjoin the adjacent convolution factor a(63) (or a (31)), because the difference between the approximation convolution factor ea(64) and the convolution factor a(64) to be approximated may be no more than $\epsilon$. By plotting an exponential curve through the two residual errors (both $<\epsilon$) a(64)−ea(64) and a(65)−ea(65), as previously done for determining the factors A(j) and B(j), an additional multiplication factor A(5) and an additional attenuation factor B(5) wll be found. FIG. 8c shows the errors then remaining (all $<\epsilon$) as a function of i. It will be apparent that there is no residual error R for the values i=64 and 65.

FIG. 9 is a detailed representation of a filter device 22 in accordance with the invention; the convolution unit 22a, the recursive filter unit 22b and the adder unit 22c can be distinguished. The preprocessing unit 20 which is also shown includes a memory M in which a group of measurement data to be processed by the filter device 22 is stored. The memory M can be accessed by the convolution unit 22a and the recursive filter 22b. The convolution unit 22a includes a register 30, an adder 31, a multiplier 32 and a further adder 33. The operation of the convolution filter 22a is as follows: for each measurement data g(j) of a group of N+1 measurement data there is calculated a filtered sub-data qc(j) so that $$qc(j) = \sum_{i=-k}^{k} g(j + i) \cdot a(i).$$

For calculating a filtered sub-data q(j), therefore, (N+1)×127 or (N+1)×63 calculations are performed, depending on whether the central section of the convolution progression contains 27 or 63 terms (see FIG. 3, a(i), where $0 \leq i < k$, where k=32 or 64). Because a(i)=a(−i), first the measurement data g(j−i) is fetched from the memory M and stored in the register 30, after which the measurement data g(j+i) is fetched. The adder adds the measurement data g(j−i) and g(j+i) and applies the sum to the multiplier 32, a further input of which receives the convolution factor a(i) whereby said sum is multiplied. The product thus obtained is applied to the adder 33, the output of which is connected to a further input thereof in order to add the product presented to the already added products previously obtained in the same way. After calculation of the filtered sub-data qc(j), the sub-data qc(j) is presented to the adder unit 22c. The sub-data qc(j) should be supplemented by a sub-data qf(j) to be determined by the recursive filter 22b, so that the sum q(j) of qc(j) and qf(j) equals $$q(j) = \sum_{i=-N}^{N} g(j - i) \cdot a(i).$$

The sub-data qf(j) to be determined by the recursive filter 22b contains two summations, as can be derived from the formulas for qc(j) and q(j):

$$qf(j) = \sum_{i=-N}^{-k} g(j - i) \cdot a(i) + \sum_{i=k}^{N} g(j - i) \cdot a(i)$$

which are successively determined by the recursive filter unit 22b. It is to be noted that for the values of (j−1)<0 no contributions are generated for the sub-data, because g(j−i) is always zero for j<i.

The value of the convolution factor a(i) for $i \geq 64$ (or 32) is approximated by the sum of five approximation factors ea1(i) to ea5(i) which are determined by the five multiplication factors A(1) to A(5) and the five attenuation factors B(1) to B(5). The operation of the recursive filter unit 22b will be described with reference to the multiplication factor A(1) and the attenuation factor B(1). For determining the sub-data qf(j) the operation to be described hereinafter is repeated four more times (each time using a different multiplication factor A(2) to A(5) and an associated attenuation factor B(2) to B(5)). The formation of the sum of the results of these five filter cycles will be described hereinafter.

The recursive filter unit 22b includes a multiplier 40, an adder 41, a second multiplier 42, a second adder 43, and a buffer memory 44. The adder 41 constitutes a recursive filter in conjunction with the multiplier 42. The first multiplier 40 receives a multiplication factor and the second multiplier receives an attenuation factor exp (B(1)). The multiplication factor applied to the multiplier 40 has the value A(1), exp (B(1), (64)), so that it equals ea1(64). A measurement data g(1024) (see FIGS. 10a and b) fetched from the memory M is multiplied by this multiplication factor. The product then represents a contribution of the signal g(1024) to the sub-data qf (960) and is applied to the adder 43. The memory 44 comprises 1024 memory locations, so that a memory location is available for each sub-data qf(j). The adder 43 sums the calculated contribution for the sub-data qf(960) and the contributions already present in the memory location "960" (in this case 0) for the sub-data qf(960). After the processing of the measurement data g(1024) by the multiplier 40, the neighbouring measurement data g(1023) is fetched and multiplied by the factor A(1)·exp (B(1)·64). At the same time the value g(1024)·A(1)·exp (B(1)·64) on the output of the adder 41 is multiplied by the attenuation factor exp (B(1)) in the multiplier 42, after which the product g(1024)·A(1)·exp (B(1)·65) is applied to the second input of the adder 41, together with the product g(1023)·A(1-)·exp (B(1)·64) calculated by the multiplier 40. The sum of the two products is stored in the memory location "959" via the adder 43 which receives the already calculated contributions to the sub-data gf(959) on the second input (in this case 0). During the second arithmetic operation, the contribution of the measurement data g(1023) as well as of the measurement data g(1024) is determined for the sub-data gf(959). During a next operation, the value on the output of the adder 41 is returned in a similar manner, via the multiplier 42 and after multiplication by the factor exp (B1), to the input of the adder 41 in order to be added to the product of the measurement data g(1022) and the factor applied to the multiplier 40. The total (g(1022+g(1023)·exp (B(1))+g(1024)·exp (B(1))·2)xA(1) exp (B(1)·64) is the total contribution made to the sub-data gf(958) by the three measurement data g(1022), g(1023) and g(1024). It will be apparent that the next arithmetic operation involving four measurement data g(1021) to g(1024) the total contribution to a sub-data gf(957) is calculated. It will also be understood that during the $x^{th}$ arithmetic operation for all measurement data g(1024) to g(1024−x+1) all contributions are determined in one operation for the sub-data gf(960−x+1). During a final, $961^{st}$ arithmetic operation all contributions of the measurement values g(1024) to g(64) to the sub-data gf(0) are calculated, said contribution total being stored in the memory location "0". The FIGS. 10a and b diagrammatically illustrate this last arithmetic operation; FIG. 10a shows a group of measurement data g(0) to g(1024) and FIG. 10b shows the series of convolution factors a(i), where $0 \leq i \leq 1024$, for determining a back-projection data g(0). During said final arithmetic operation 961 for all measurement data g(64) to g(1024) the contribution total to the sub-data gf(0) has been determined by the recursive filter unit 22b. This is denoted by the path rf in FIG. 10b. The contributions of the measurement data g(0) to g(63) to the back-projection data q(0) are determined by the convolution filter 22a in the described manner; this is denoted by the path cf in FIG. 10b. By repeating the foregoing calculations by the recursive filter 22 four times, using successively the multiplication factors A(2) to A(5) and the associated attenuation factors B(2) to B(5), the conributions to the sub-data qf(960) to qf(0) already stored in the memory 44 are supplemented in such a manner that a convolution of the measurement data g(64) to g(1024) by the convolution factors a(64) to a(1024) is approximated.

It will be appreciated from the foregoing that during a $36^{st}$ arithmetic operation, taken by way of example, the total contribution of the measurement data $g(1024-361+1)=g(664)$ to g(1024) to the sub-data gf(600) is determined (and stored in the memory location "600" in the buffer memory 44). This is diagrammatically represented by the path rf1 in FIG. 10c which contains the convolution factors a(64) to a(424). The contributions of the measurement data g(537) to g(663) to the back-projection data q(600) are calculated by the convolution filter 22a. This is denoted by the path cf in FIG. 10c. There remains a path rf2 which comprises the measurement data g(0) to g(535) whose contributions to the back-projection data q(600) must still be determined. Such a path rf2 exists for all back-projection data q(64) to q(960): for q(64) this path contains only the measurement data g(0) and for q(960) the path rf2 contains the measurement data g(0) to g(896). The contributions in the path rf2 are calculated in the same way by the recursive filter unit 22b as in the path rf1, be it that the first measurement data applied is the measurement data g(0). After multiplication by A(1)·exp (B(1)·64) in the multiplier 40, this contribution is stored in the memory location 64 in the memory 44 and added to the contributions already stored in this memory location 64. Subsequently, the measurement data g(1) is applied to the recursive filter unit 22b in order to calculate the contribution g(1)·A(1)·exp (B(1)·64)+g(0)·A(1)·exp (B(1)·65) which is added to the contributions already stored in the memory location 65. Subsequently, the measurement data g(2) is processed in order to determine the total contribution of the measurement data g(0), g(1) and g(2) to the sub-data qf(66), followed by the processing of the measurement data g(3) and so on. After the processing of the measurement data g(960) by the recursive filter unit 22b and after the measurement data g(0) to g(960) has been processed four more times by the recursive filter unit 22b, be it on the basis of successively the multiplication factors A(2) to A(5) and the associated attenuation factors B(1) to B(5), the sub-data qf(0) to qf(1024) has been completed. Subsequently, the sub-data qf(i) determined by the recursive filter unit 22b and the sub-data qc(i) determined by the convolution unit is added, so that the back-projection data q(i) becomes available on the output of the adder unit 22c.

Because the operation of the convolution unit 22a is much slower than that of the recursive filter unit 22b, generally no buffer memory will be required between the output of the adder 33 and the input of the adder unit 22c for the temporary storage of a number (certainly not all!) of sub-data qc(i). The time required for convolution is: k·N·XC, where k is the number of convolution factors (64), N is the number of measurement data (1025), and XC is the multiplication time (160 ns). It is to be noted that the period of time required for convolution now depends only linearly on the number of measurement data rather than squarelaw ($N^2$) as in the state of the art. The calculation time required by the recursive filter unit 22b amounts to $2·R·(N-k)·XR·2$, where R is the number or recursive terms (5) and XR is the multiplication time of the recursive filter (160 ns), In the present example recursive filtering is three times faster than the associated convolution filtering.

In the embodiment shown in FIG. 9 the multiplication factors A(i)·exp (B(i)·64) are stored in a memory 45 comprising five memory locations, the output of the memory being connected to an input of the multiplier 40. Similarly, the factors exp (B(i)) are stored in a five-location memory 46 whose output is connected to the input of the multiplier 42. The address inputs of the memories 45 and 46 can be controlled in parallel and have been omitted for the sake of clarity; the supply lines for clock (synchronization) pulses for controlling the filter device 22 have been omitted for the same reason. The five different groups of convolution factors (each comprising 64 factors) are stored in a memory 34 which includes five sections comprising 64 memory locations each, the output of said memory being connected to the input of the multiplier 32. The embodiment shown in FIG. 9 is one of the simplest and least expensive embodiments. For accelerating the convolution calculation, a second (and a third) convolution filter could be connected parallel to the convolution filter 22 shown. In that case the adder unit 22c should include three (or four) adder inputs and it would also be necessary to insert buffer memories having at least one (or a few) memory location between the adder 33 of the parallel-connected convolution filters and the adder unit 22c. Evidently, parallel-connected convolution units can make common use of a single convolution factor memory 34. Parallel-connection of two (or more) recursive filter units makes sense only if the processing speed for the measurement data by the (parallel-connected) convolution filters equals approximately the processing speed of a recursive filter unit.

What is claimed is:

1. In computer tomography apparatus for determining a radiation attenuation distribution in a body which includes a radiation source, radiation source displacement means for irradiating a region of the body from a plurality of source positions, detection means for detecting attenuated radiation which has passed through the body in order to form groups of measurement data, filter means for determining groups of back-projection data from the groups of measurement data, back projection means which determine the attenuation distribution from the groups of back-projection data, and storage means for storing the attenuation distribution the improvement wherein the filter means comprise a combination of convolution means, and a recursive filter and a first adder which is connected to sum outputs from the convolution means and the recursive filter and has an output connected to the back-projection means.

2. Improved computer tomography apparatus as claimed in claim 1, wherein the convolution means includes a convolution factor memory for the storage of at least one progression of convolution factors, the number of factors of said progression being more than thirty and less than one hundred.

3. Improved computer tomography apparatus as claimed in claim 2, wherein the convolution factor memory comprises several sections, one progression of convolution factors being stored in each section.

4. Improved computer tomography apparatus as claimed in claim 2, wherein said progression comprises 64 convolution factors.

5. Improved computer tomography apparatus as claimed in claim 1, 2, 3 or 4, wherein the convolution means includes a multiplier which has two inputs for receiving convolution factors and measurement data to be multiplied thereby and a second adder having an input which is connected to the output of the multiplier and an output which is connected back to a second input of said second adder.

6. Improved computer tomography apparatus as claimed in claim 5, wherein the convolution means further includes a third adder and a register, the output of the third adder being connected to an input of the multiplier, a first input of the third adder being connected to the output of the register, the register storing first measurement data and the third adder receiving second measurement data on its second input in order to add the first and the second measurement data.

7. Improved computer tomography apparatus as claimed in any one of claims 1, 2, 3 or 4, which includes at least two convolution means connected in parallel.

8. Improved computer tomography apparatus as claimed in any one of the claims 1, 2, 3, or 4, wherein the recursive filter means includes a first multiplier, a second multiplier and a fourth adder, the first multiplier including a first and a second input for respectively receiving a multiplication factor and measurement data and an output which is connected to a first input of the fourth adder, the output of the fourth adder being the output of the recursive filter and being connected to a first input of the second multiplier the output of the second multiplier being output is connected to a second input of the fourth adder and the second multiplier further including a second input for receiving an attenuation factor.

9. Improved computer tomography apparatus as claimed in claim 8, wherein the first input of the first multiplier together with the second input of the second multiplier is connected to an output of a memory which includes memory locations for the storage of a number of multiplication factors and a corresponding number of attenuation factors.

10. Improved computer tomography apparatus as claimed in claim 9, wherein the output of the fourth adder is connected to a fifth adder whose output is connected to an input of a buffer memory, the output of the buffer memory being connected to an input of the first adder as well as to an input of the fifth adder.

* * * * *